(No Model.)
E. FIRTH & A. & I. TOMPKINS.
DIE FOR MAKING AXLE NUTS.
No. 396,864. Patented Jan. 29, 1889.
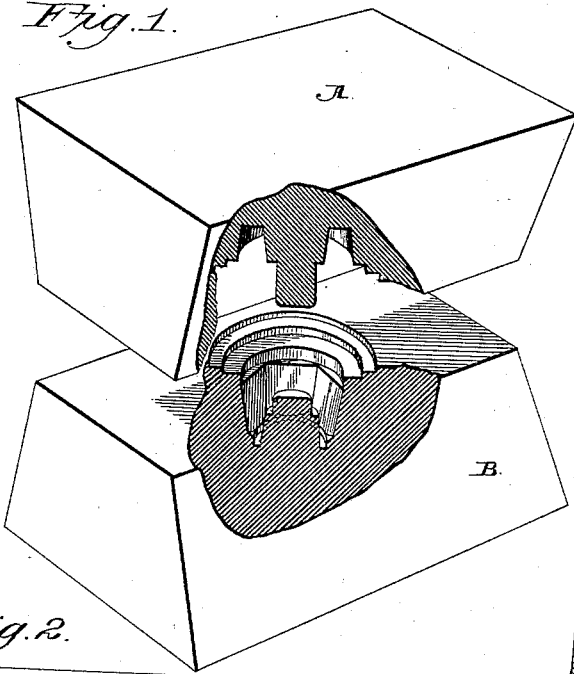
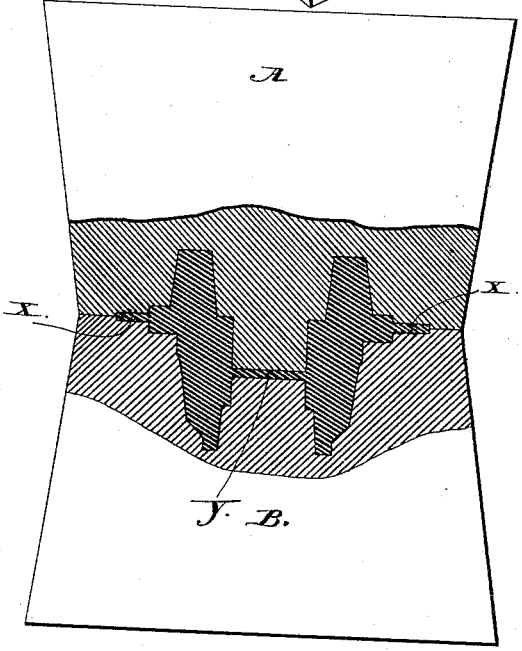
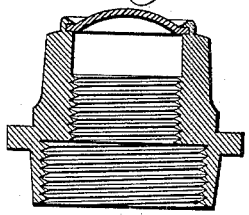
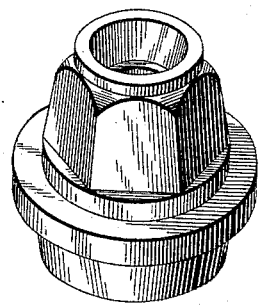
Witnesses:
M. Fowler
J. W. Garner
Inventors:
Edwin Firth
Albert Tompkins and
Ira Tompkins
by their Attorneys

UNITED STATES PATENT OFFICE.

EDWIN FIRTH, ALBERT TOMPKINS, AND IRA TOMPKINS, OF TROY, NEW YORK.

DIE FOR MAKING AXLE-NUTS.

SPECIFICATION forming part of Letters Patent No. 396,864, dated January 29, 1889.

Application filed November 14, 1887. Serial No. 255,129. (No model.)

*To all whom it may concern:*

Be it known that we, EDWIN FIRTH, ALBERT TOMPKINS, and IRA TOMPKINS, citizens of the United States, residing at Troy, in the county of Rensselaer and State of New York, have invented a new and useful Improvement in Drop-Forged Steel Axle-Nuts, of which the following is a specification.

Our invention relates to an improvement in drop-forged steel axle-nuts, as will be more fully set forth hereinafter, and particularly pointed out in the claims.

It is the object of our invention to construct an axle-nut which, for toughness, superiority of finish, durability, and economy, will far exceed anything that has preceded it.

In the accompanying drawings, Figure 1 is a perspective view, partly in section, of a pair of dies adapted to forge an axle-nut embodying our improvements. Fig. 2 is a sectional view of the same, showing the dies closed together to forge the nut. Fig. 3 is a detached perspective view of our improved form of nut after it has left the dies. Fig. 4 is a longitudinal section of the nut shown in Fig. 3 after the latter has been counterbored and threaded internally and fitted with the cap.

Axle-nuts have heretofore been made of cast-iron, brass, and other materials, which are not as hard or durable as the spindles of steel axles, and are consequently objectionable, for the reason that the threads cut from the said nuts to fit the threads on the axles become worn after a while and permit the nut to work loose and drop from the axles and allow the wheels to come off. A further objection to nuts made of malleable cast-iron is that the screw-threads formed therein cannot be made entire.

To attain the object of our invention, we provide a nut which is forged from steel and is as hard as the material of which the axle is composed, so that the threads in the nut will not become worn by screwing and unscrewing the same on the axle.

Our method of making such a nut is as follows: A pair of blocks, A B, have dies formed in them adapted to form a nut of the requisite size and shape. The lower die is placed on the bed of a drop-hammer. The upper die is secured to the hammer-head in the usual manner and arranged to register with the lower die. Into the latter is placed a piece of steel of such size (as near as possible) as it is thought will complete the nut, but in all cases there will be a surplus left. This piece of steel is heated until it becomes plastic. As soon as the plastic steel is placed in the lower die the hammer is operated and caused to descend, so that the upper die shall drop onto the lower die and thereby form the nut, as shown in Fig. 2, any requisite number of strokes being given to the hammer to accomplish this result. The surplus steel or "fin," as it is termed, (shown by the letter X in Fig. 2,) is afterward cut off by a suitable punch-and-die machine. Each die is provided with a central projecting portion, but the projection of the upper die is longer than that of the lower die, so that when the dies come together the central projection of the upper die enters the lower die. The central projecting portions of the two dies do not come together at the center, leaving a surplus of metal at that point, as at V, which is subsequently punched out after the nut has been forged. The act of forging the steel nut forces the dross and other impurities from the steel and compresses the molecular particles of the steel and thereby toughens the nut, as will be readily understood. After removing the nut from the dies the same is finished and has its screw-threads cut in its inner side and is fitted for the market.

In forming the oil-chamber in the nut the partially completed nut (shown in Fig. 3) is counterbored in the usual manner when finishing the nut after it is forged. The nut is then threaded internally, and a cap is applied to close the outer end of the nut. Fig. 4 shows the completed axle-nut.

A nut thus manufactured is as hard as the steel of which vehicle-axles are composed, is adapted to have perfect screw-threads cut in its interior, and is very much more durable than the malleable and cast nuts heretofore manufactured.

No claim is made in this application to the method hereinbefore described for making axle-nuts, as said method forms the subjectmatter for a separate application for Letters Patent of the United States, which we intend to shortly file.

Having thus described our invention, we claim—

1. In an apparatus for making drop-forged steel axle-nuts, the blocks A B, having the dies formed in their opposing sides, the said dies being adapted to the contour of an axle-nut, substantially as described.

2. In an apparatus for making drop-forged steel axle-nuts, the blocks A B, having the dies formed in their opposing sides, which dies have the central projecting portions, which do not come together when in operation, but leave a surplus of metal at that point, as set forth.

In testimony that we claim the foregoing as our own we have hereto affixed our signatures in presence of two witnesses.

EDWIN FIRTH.
ALBERT TOMPKINS.
IRA TOMPKINS.

Witnesses:
ANDREW SIMS,
HARRY J. TOMPKINS.